US007912049B2

(12) United States Patent
Gutknecht et al.

(10) Patent No.: US 7,912,049 B2
(45) Date of Patent: Mar. 22, 2011

(54) SYSTEM AND METHOD FOR SELECTING A MULTICAST IP ADDRESS

(76) Inventors: Gary Robert Gutknecht, Noblesville, IN (US); Mark A. McCleary, Indianapolis, IN (US)

( * ) Notice: Subject to any disclaimer, the term of this patent is extended or adjusted under 35 U.S.C. 154(b) by 715 days.

(21) Appl. No.: 11/823,077

(22) Filed: Jun. 26, 2007

(65) Prior Publication Data

US 2009/0003352 A1 Jan. 1, 2009

(51) Int. Cl.
*H04L 12/28* (2006.01)
*H04L 12/56* (2006.01)

(52) U.S. Cl. .................... 370/389; 370/395.32; 709/226

(58) Field of Classification Search ........................ None
See application file for complete search history.

(56) References Cited

U.S. PATENT DOCUMENTS

| | | | | |
|---|---|---|---|---|
| 6,557,031 | B1 * | 4/2003 | Mimura et al. | 709/218 |
| 2004/0177146 | A1 * | 9/2004 | Ishiyama et al. | 709/226 |
| 2008/0267210 | A1 * | 10/2008 | Sidana | 370/449 |

FOREIGN PATENT DOCUMENTS

| | | |
|---|---|---|
| EP | 1 161 059 | 12/2001 |
| WO | WO 2004/054157 A2 | 6/2004 |

OTHER PUBLICATIONS

Search Report Dated Jul. 3, 2006.

* cited by examiner

*Primary Examiner* — Chirag G Shah
*Assistant Examiner* — Minh-Trang Nguyen
(74) *Attorney, Agent, or Firm* — Robert D. Shedd; Vincent E. Duffy; Michael A. Pugel

(57) ABSTRACT

The disclosed embodiments relate to a system and method for selecting a multicast IP address. More specifically, there is provided a method comprising selecting a first IP address from a plurality of IP addresses, hashing the first IP address to create a first hash value corresponding to the first IP address, determining whether the first hash value corresponds to a second IP address that is in use, and allocating the first IP address if the first hash value does not correspond to the second IP address that is in use.

17 Claims, 4 Drawing Sheets

SYSTEM AND METHOD FOR SELECTING A MULTICAST IP ADDRESS

This application claims the benefit under 35 U.S.C. §365 of International Application PCT/US2005/038757, filed Oct. 26, 2005, which was published in accordance with PCT article 21(2) on May 3, 2007 in English.

FIELD OF THE INVENTION

The present invention relates generally to transmitting video or other digital data over a network. More specifically, the present invention relates to a system for selecting a multicast group for multicasting video, audio, or other data over an internet protocol ("IP") network.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

As most people are aware, satellite television systems, such as DirecTV, have become much more widespread over the past few years. In fact, since the introduction of DirecTV in 1994, more than twelve million American homes have become satellite TV subscribers. Most of these subscribers live in single-family homes where satellite dishes are relatively easy to install and connect. For example, the satellite dish may be installed on the roof of the house.

Many potential subscribers, however, live or temporarily reside in multi-dwelling units ("MDUs"), such as hotels or high-rise apartment buildings. Unfortunately, there are additional challenges involved with providing satellite TV services to the individual dwelling units within an MDU. It may be impractical and/or extremely expensive to provide and connect one satellite dish per dwelling. For example, in a high-rise apartment building with one thousand apartments, it may be impractical to mount one thousand satellite dishes on the roof of the building. Some conventional systems have avoided these issues by converting the digital satellite television signal into an analog signal that can be transmitted via a single coaxial cable to a plurality of dwellings. These systems, however, offer limited channels, have reduced quality compared to all-digital systems, and cannot provide the satellite TV experience that users who live in single family homes are accustomed.

An improved system and/or method for providing satellite TV to a multi-dwelling unit is desirable.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for selecting a multicast IP address. More specifically, there is provided a method comprising selecting a first IP address from a plurality of IP addresses, hashing the first IP address to create a first hash value corresponding to the first IP address, determining whether the first hash value corresponds to a second IP address that is in use, and allocating the first IP address if the first hash value does not correspond to a second IP address that is in use.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
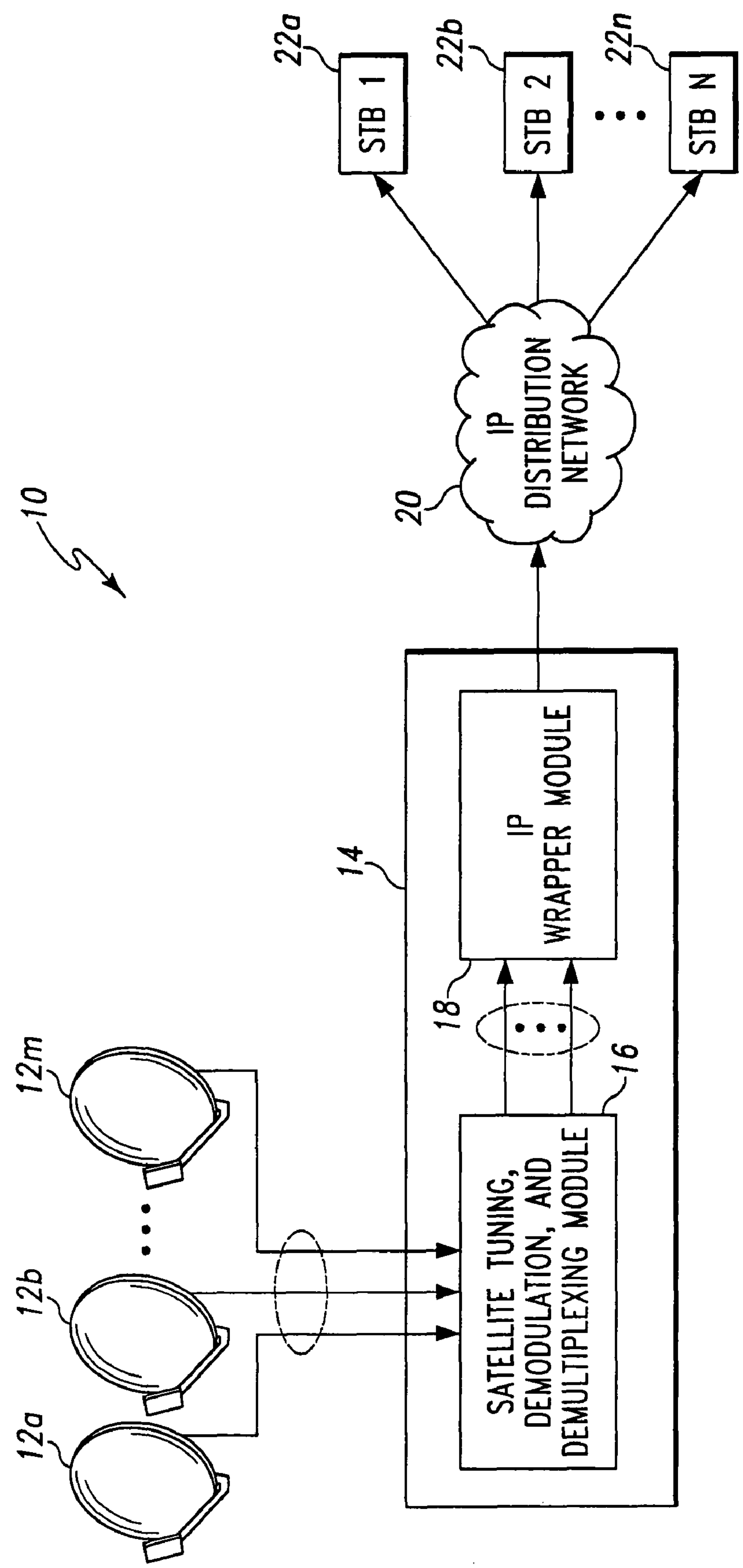
FIG. 1 is a block diagram of an exemplary satellite television over IP system in accordance with one embodiment of the present invention.

Turning to FIG. 1, a block diagram of an exemplary satellite television over IP system in accordance with one embodiment is illustrated and generally designated by a reference numeral 10. As illustrated, in one embodiment, the system 10 may include one or more satellite dishes **12*a* through 12*m*, a head-end unit, such as a satellite gateway 14, an IP distribution network 20, and one or more set top boxes ("STBs") 22*a* through 22*n*. Those of ordinary skill in the art, however, will appreciate that the embodiment of the system 10 illustrated in FIG. 1 is merely one potential embodiment of the system 10. As such, in alternate embodiments, the illustrated components of the system 10 may be rearranged or omitted or additional components may be added to the system 10. For example, with minor modifications, the system 10** may configured to distributed non-satellite video and audio services.

The satellite dishes **12*a*-12*m* may be configured to receive video, audio, or other types of television-related data that is transmitted from satellites orbiting the earth. As will be described further below, in one embodiment the satellite dishes 12*a*-12*m* are configured to receive DirecTV programming over KU band from 10.7 to 12.75 Gigahertz ("GHz"). In alternate embodiments, however, the satellite dishes 12*a*-12*m* may be configured to receive other types of direct broadcast satellites ("DBS") or television receive-only ("TVRO") signal, such as Dish Network signals, ExpressVu signals, StarChoice signals, and the like. In still other non-satellite based systems, the satellite dishes 12*a*-12*m* may be omitted from the system 10**.

In one embodiment, a low noise-block ("LNB") within the satellite dishes 12*a*-12*m* receives the incoming signal from the earth-orbiting satellite and converts these incoming signals to a frequency in the L band between 950 and 2150 Megahertz ("MHz"). As will be described in further detail below with regard to FIG. 2, each of the satellites 12*a*-12*m* may be configured to receive one or more incoming satellite TV signals on a particular frequency (referred to as a transponder) and with a particular polarization and to convert these satellite signals to L band signals, each of which may contain a plurality of video or audio signals.

As illustrated in FIG. 1, the satellite dishes 12*a*-12*m* may be configured to transmit the L band signals to a head-end unit or gateway server, such as the satellite gateway 14. In alternate, non-satellite embodiments, the head-end unit may be a cable television receiver, a high definition television receiver, or other video distribution system The satellite gateway 14 includes a satellite tuning, demodulating, and demultiplexing module 16 and an IP wrapper module 18. The module 16 may contain a plurality of tuners, demodulators, and demultiplexers to convert the modulated and multiplexed L band signals transmitted from the satellites 12*a*-12*m* into a plurality single program transport streams ("SPTS"), each of which carries a service (e.g., television channel video, television channel audio, program guides, and so forth). In one embodiment, the module 16 is configured to produce a single program transport stream for all of the services received by the satellite dishes 12*a*-12*m*. In an alternate embodiment, however, the module 16 may produce transport streams for only a subset of the services received by the satellite dishes 12*a*-12*m*.

The satellite tuning, demodulating, and demultiplexing module 16 may transmit the SPTS to the IP wrapper module 18. In one embodiment, the IP wrapper module 18 repackages the data within the SPTS into a plurality of internet protocol ("IP") packets suitable for transmission over the IP distribution network 20. For example, the IP wrapper module 18 may convert DirecTV protocol packets within the SPTS into IP packets. In addition, the IP wrapper module 18 may be configured to receive server requests from the STBs 22*a*-22*n* and to multicast (i.e., broadcast to one or more of the STBs 22*a*-22*n* over an IP address) the IP SPTS to those STBs 22*a*-22*n* that had requested the particular service.

In an alternative embodiment, the IP wrapper module 18 may also be configured to multicast IP protocol SPTS for services not requested by one of the STBs 22*a*-22*n*. It should be noted that the modules 16 and 18 are merely one exemplary embodiment of the satellite gateway 14. In alternate embodiments, such as the one described below in regard to FIGS. 2 and 3, the functions of the modules 16 and 18 may be redistributed or consolidated amongst a variety of suitable components or modules.

The IP distribution network 20 may include one or more routers, switches, modem, splitters, or bridges. For example, in one embodiment, the satellite gateway 14 may be coupled to a master distribution frame ("MDF") that is coupled to an intermediate distribution frame ("IDF") that is coupled to a coax to Ethernet bridge that is coupled to a router that is coupled to one or more of the STBs 22*a*-22*n*. In another embodiment, the IP distribution network 20 may be an MDF that is coupled to a Digital Subscriber Line Access Multiplexer ("DSLAM") that is coupled to a DSL modem that is coupled to a router. In yet another embodiment, the IP distribution network may include a wireless network, such as 802.11 or WiMax network. In this type of embodiment, the STBs 22*a*-22*n* may include a wireless receiver configured to receive the multicast IP packets. Those of ordinary skill in the art will appreciate that the above-described embodiments are merely exemplary. As such in alternate embodiments, a large number of suitable forms of IP distribution networks may be employed in the system 10.

The IP distribution network 20 may be coupled to one or more STBs 22*a*-22*n*. The STBs 22*a*-22*n* may be any suitable type of video, audio, and/or other data receiver capable of receiving IP packets, such as the IP SPTS, over the IP distribution network 20. It will be appreciated the term set top box ("STB"), as used herein, may encompass not only devices that sit upon televisions. Rather the STBs 22*a*-22*n* may be any device or apparatus, whether internal or external to a television, display, or computer, that can be configured to function as described herein—including, but not limited to a video components, computers, wireless telephones, or other forms video recorder. In one embodiment, the STBs 22*a*-22*n* may be a DirecTV receiver configured to receive services, such as video and/or audio, through an Ethernet port (amongst other inputs). In alternate embodiments, the STBs 22*a*-22*n* may be designed and/or configured to receive the multicast transmission over coaxial cable, twisted pair, copper wire, or through the air via a wireless standard, such as the I.E.E.E. 802.11 standard.

Figure 2:
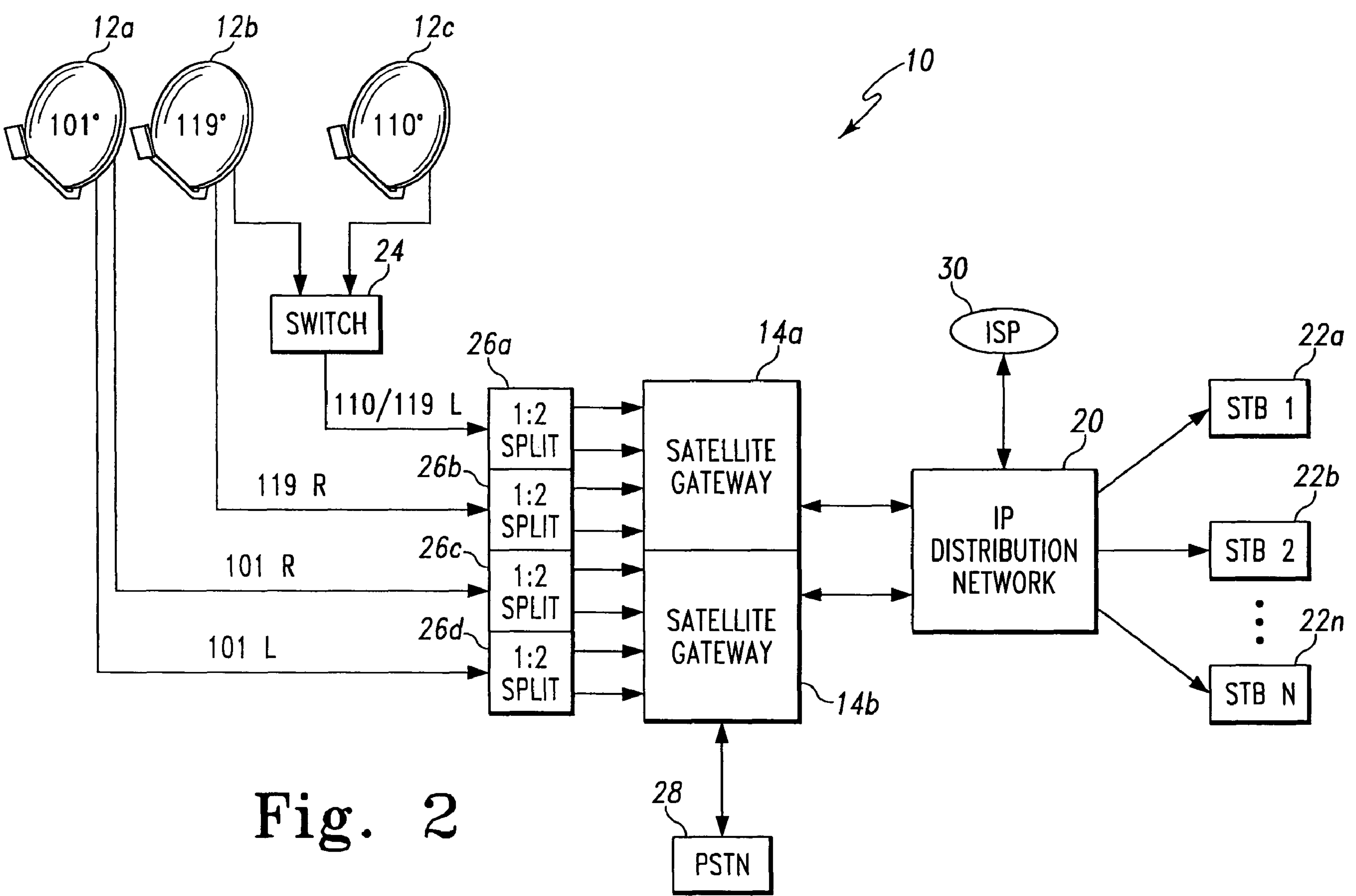
FIG. 2 is another embodiment of the exemplary satellite television over IP system illustrated in FIG. 1 of the present invention.

As discussed above, the system 10 may receive video, audio, and/or other data transmitted by satellites in space and process/convert this data for distribution over the IP distribution network 20. Accordingly, FIG. 2 is another embodiment of the exemplary satellite television over IP system 10 in accordance with one embodiment. FIG. 2 illustrates three exemplary satellite dishes 12*a*-12*c*. Each of the satellite dishes 12*a*-12*c* may be configured to receive signals from one or more of the orbiting satellites. Those of ordinary skill will appreciate that the satellites and the signals that are transmitted from the satellites are often referred to by the orbital slots in which the satellites reside. For example, the satellite dish 12*a* is configured to receive signals from a DirecTV satellite disposed in an orbital slot of 101 degrees. Likewise, the satellite dish 12*b* receives signals from a satellite disposed at 119 degrees, and the satellite dish 12*c* receives signals from a satellite disposed at orbital slot of 110 degrees. It will be appreciated that in alternate embodiments, the satellite dishes 12*a*-12*c* may receive signals from a plurality of other satellites disclosed in a variety of orbital slots, such as the 95 degree orbital slot. In addition, the satellite dishes 12*a*-12*c* may also be configured to receive polarized satellite signals. For example, in FIG. 2, the satellite dish 12*a* is configured to receive signals that are both left polarized (illustrated in the figure as "101 L") and right polarized (illustrated as "101 R").

As described above in regard to FIG. 1, the satellite dishes 12*a*-12*c* may receive satellite signals in the KU band and convert these signals into L band signals that are transmitted to the satellite gateway 14. In some embodiments, however, the L band signals produced by the satellite dishes 12*a*-12*c* may be merged into fewer signals or split into more signals prior to reaching the satellite gateway 14. For example, as illustrated in FIG. 2, L band signals from the satellite dishes 12*b* and 12*c* may be merged by a switch 24 into a single L band signals containing L band signals from both the satellite at 110 degrees and the satellite at 119 degrees.

As illustrated, the system 10 may also include a plurality of 1:2 splitters 26*a*, 26*b*, 26*c*, and 26*d* to divide the L band signals transmitted from the satellite dishes 12*a*-12*c* into two L band signals, each of which include half of the services of the pre-split L band signal. In alternate embodiments, the 1:2 splitters 26*a*-26*b* may be omitted or integrated into the satellite gateways 14*a* and 14*b*.

The newly split L band signals may be transmitted from the 1:2 splitters 26*a*-26*d* into the satellite gateways 14*a* and 14*b*. The embodiment of the system 10 illustrated in FIG. 2 includes two of the satellite gateways 14*a* and 14*b*. In alternate embodiments, however, the system 10 may include any suitable number of satellite gateways 14. For example, in one embodiment, the system may include three satellite gateways 14.

The satellite gateways 14*a* and 14*b* may then further subdivide the L band signals and then tune to one or more services on the L band signal to produce one or more SPTS that may be repackaged into IP packets and multicast over the IP distribution network 20. In addition, one or more of the satellite gateways 14*a*, 14*b* may also be coupled to a public switch telephone network ("PSTN") 28. Because the satellite gateways 14*a, b* are coupled to the PSTN 28, the STBs 22*a*-22*n* may be able to communicate with a satellite service provider through the IP distribution network 20 and the satellite gateways 14*a, b*. This functionality may advantageously eliminate the need to have each individual STBs 22*a*-22*n* coupled directly to the PSTN 28.

The IP distribution network 20 may also be coupled to an internet service provider ("ISP") 30. In one embodiment, the IP distribution network 20 may be employed to provide internet services, such as high-speed data access, to the STBs 22*a*-22*n* and/or other suitable devices (not shown) that are coupled to the IP distribution network 20.

Figure 3:
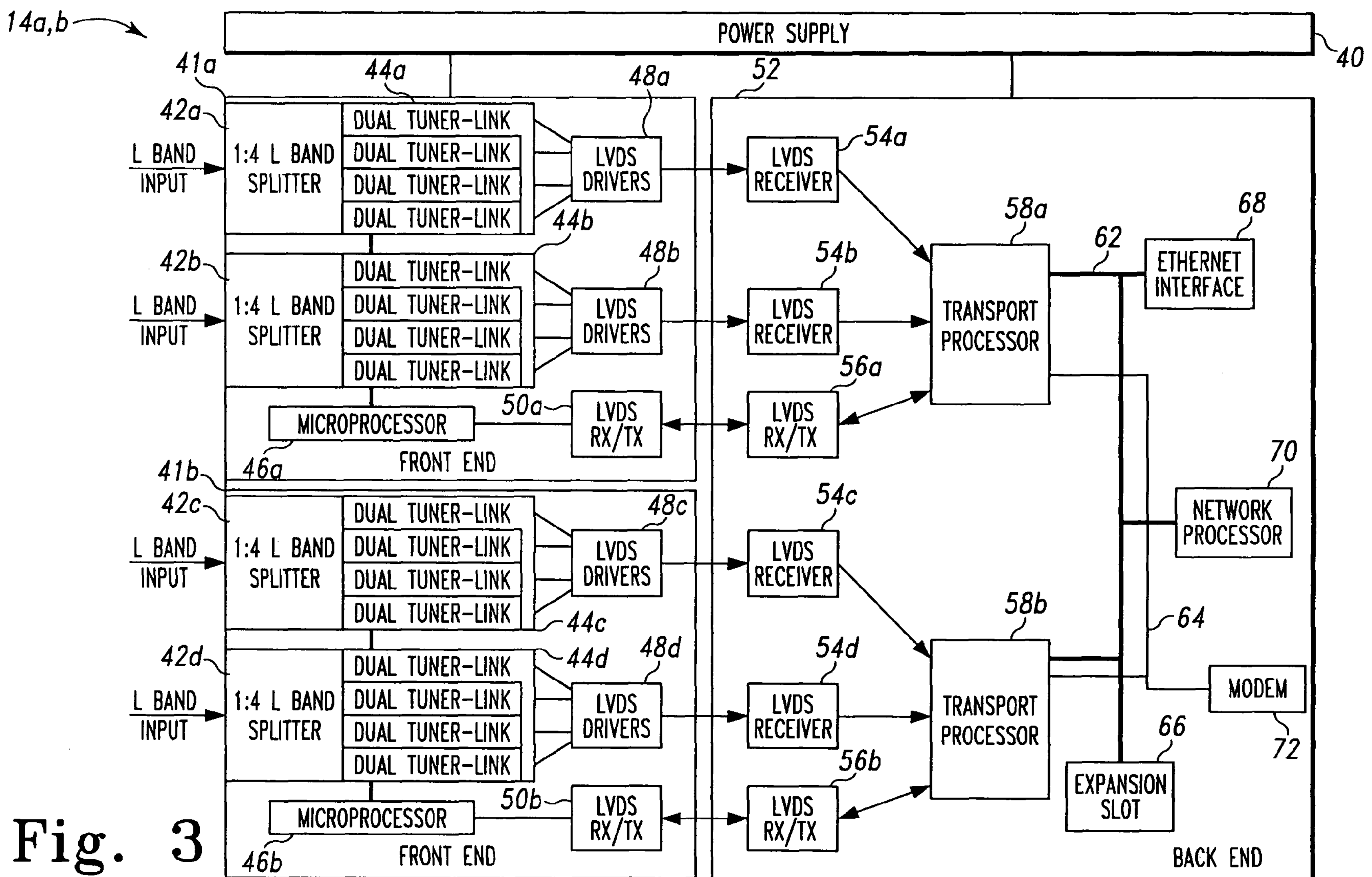
FIG. 3 is a block diagram of an exemplary satellite gateway of the present invention.

As described above, the satellite gateways 14*a, b* may be configured to receive the plurality of L band signals, to produce a plurality of SPTS, and to multicast requested SPTS over the IP distribution network 20. Referring now to FIG. 3, a block diagram of an exemplary satellite gateway 14 is shown. As illustrated, the satellite gateway 14*a, b* includes a power supply 40, two front-ends 41*a* and 41*b* and a back-end 52. The power supply 40 may be any one of a number of industry-standard AC or DC power supplies configurable to enable the front-ends 41*a, b* and the back-end 52 to perform the functions described below.

The satellite gateway 14*a, b* may also include two front-ends 41*a, b*. In one embodiment, each of the front-ends, 41*a, b* may be configured to receive two L band signal inputs from the 1:2 splitters 26*a*-26*d* that were described above in regards to FIG. 2. For example, the front-end 41*a* may receive two L band signals from the 1:2 splitter 26*a* and the front-end 41*b* may receive two L band signals from the 1:2 splitter 26*b*. In one embodiment, each of the L band inputs into the front-end 41*a, b* includes eight or fewer services.

The front-ends 41*a, b* may then further sub-divide the L band inputs using 1:4 L band splitters 42*a*, 42*b*, 42*c*, and 42*d*. Once subdivided, the L band signals may pass into four banks 44*a*, 44*b*, 44*c*, and 44*d* of dual tuner links. Each of the dual tuner links within the banks 44*a*-44*d* may be configured to tune to two services within the L band signals received by that individual dual tuner links to produce SPTS. Each of the dual tuner links may then transmit the SPTS to one of the low-voltage differential signaling ("LVDS") drivers 48*a*, 48*b*, 48*c*, and 48*d*. The LVDS drivers 48*a*-48*d* may be configured to amplify the transport signals for transmission to the back-end 52. In alternate embodiments, different forms of differential drivers and/or amplifiers may be employed in place of the LVDS drivers 48*a*-48*d*. Other embodiments may employ serialization of all of the transport signals together for routing to the back end 52.

As illustrated, the front-ends 41*a, b* may also include microprocessors 46*a* and 46*b*. In one embodiment, the microprocessors 46*a, b* may control and/or relay commands to the banks 44*a*-44*d* of dual tuner links and the 1:4 L band splitters 42*a*-42*d*. The microprocessors 46*a, b* may comprise ST10 microprocessors produce by ST Microelectronics. The microprocessors 46*a, b* may be coupled to LVDS receiver and transmitter modules 50*a* and 50*b*. The LVDS receiver/transmitter modules 50*a, b* may facilitate communications between the microprocessors 46*a, b* and components on the back-end 52, as will be described further below.

Turning next to the back-end 52, the back-end 52 includes LVDS receivers 54*a*, 54*b*, 54*c*, and 54*d*, which are configured to receive transport stream signals transmitted by the LVDS drivers 48*a*-48*d*. The back-end 52 also includes LVDS receiver/transmitter modules 56*a* and 56*b* which are configured to communicate with the LVDS receiver/transmitter modules 50*a, b*.

As illustrated, the LVDS receivers 54*a*-54*d* and the LVDS receiver/transmitters 56*a, b* are configured to communicate with transport processors 58*a* and 58*b*. In one embodiment, the transport processors 58*a, b* are configured to receive the SPTS produced by the dual tuner links in the front-ends 41*a, b*. For example, in one embodiment, the transport processors 58*a, b* may be configured to produce 16 SPTS. The transport processors 58*a, b* may be configured to repack the SPTS into IP packets which can be multicast over the IP distribution network 20. For example, the transport processors 58*a, b* may repackage DirecTV protocol packets into IP protocol packets and then multicast these IP packets on an IP address to one or more of the STBs 22*a*-22*n*

The transport processors 58*a, b* may also be coupled to a bus 62, such as a 32 bit, 66 MHz peripheral component interconnect ("PCI") bus. Through the bus 62, the transport processors 58*a, b* may communicate with a network processor 70, an Ethernet interface 84, and/or an expansion slot 66. The network processor 70 may be configured to receive requests for services from the STBs 22*a*-22*n* and to direct the transport processors 58*a, b* to multicast the requested services. In one embodiment, the network processor is an IXP425 network processor produced by Intel. While not illustrated, the network processor 70 may also be configured to transmit status data to a front panel of the satellite gateway 14*a*, b or to support debugging or monitoring of the satellite gateway 14*a, b* through debug ports.

As illustrated, the transport processors 58*a, b* may also be coupled to the Ethernet interface 68 via the bus 62. In one embodiment, the Ethernet interface 68 is a gigabit Ethernet interface that provides either a copper wire or fiber-optic interface to the IP distribution network 20. In addition, the bus 62 may also be coupled to an expansion slot, such as a PCI expansion slot to enable the upgrade or expansion of the satellite gateway 14*a, b*.

The transport processors 58*a, b* may also be coupled to a host bus 64. In one embodiment, the host bus 64 is a 16-bit data bus that connects the transport processors 58*a, b* to a modem 72, which may be configured to communicate over the PSTN 28, as described above. In alternate embodiments, the modem 72 may also be coupled to the bus 62.

As described above, the satellite gateways 14 may be configured to receive services, such as television video, audio, or other data and to multicast these services to the STBs 22*a*-22*n* across the IP distribution network 20. In one embodiment, the STBs 22*a*-22*n* employ an Ethernet integrated circuit ("IC") to monitor the IP distribution network 20 for multicasts of interest to each particular one of the STBs 22*a*-22*n*. In other words, the Ethernet ICs within each of the STBs 22*a*-22*n* may monitor the IP distribution network 20 for transmissions on the IP addresses that are being used to transmit those services being used by each of the STBs 22*a*-22*n*. For example, the satellite gateway 14 may multicast a service to a first group of STBs on one IP address and multicast a second service to second set of STBs on a second IP address. In this example, the Ethernet ICs within the first group of STBs would monitor the IP distribution network 20 for activity on the first IP address, and the Ethernet ICs within the second group of STBs would monitor for activity on the second IP address. The Ethernet IC may monitor for activity on a particular IP address by comparing the IP address of the incoming packet with the IP address that is being monitored.

Typically, however, to reduce the computational complexity for the Ethernet ICs, the IP addresses may be hashed down to a simpler number to simplify this comparison. For example, the 32-bit IP address may be reduced down to a 6-bit value via hashing. Those of ordinary skill in the art will appreciate, however, that whereas a 32-bit IP address provides millions of non-redundant identifying values, a 6-bit value only provides 64 unique values, which can be referred to as hash buckets. Accordingly, while hashing the IP addresses reduces the complexity for the Ethernet IC, it may introduce additional challenges within the system 10. For example, if two unrelated multicast groups employ IP addresses that hash to the same 6-bit value, the STBs that are monitoring for either one of these IP addresses will be interrupted for both. These unneeded interruptions can lead to choppy or distorted playback of video and/or audio on the STBs 22*a*-22*n*. As such, reducing hash conflicts amongst the multicast groups is desirable.

Figure 4:
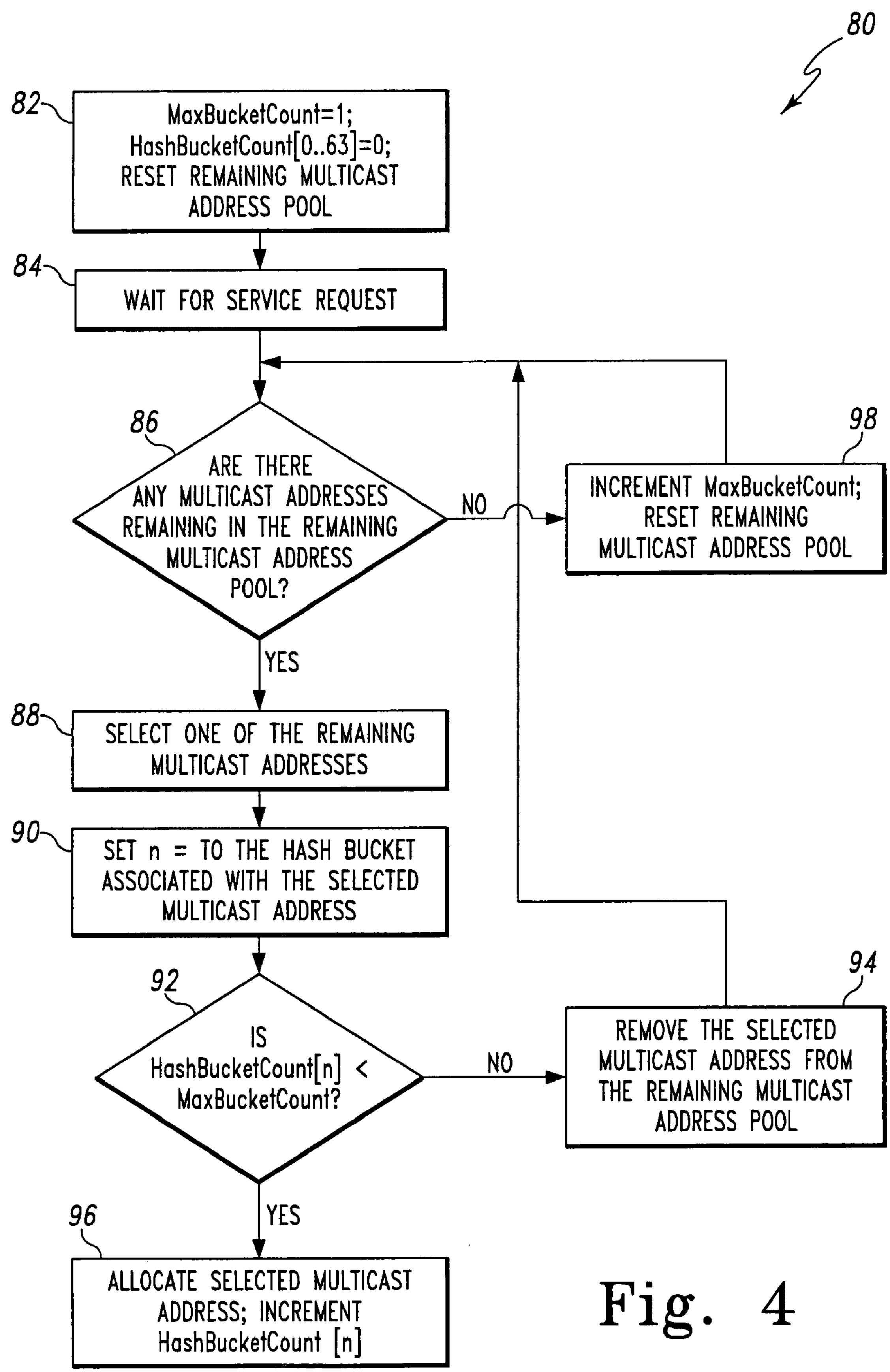
FIG. 4 is a flow chart illustrating an exemplary technique for selecting a multicast IP address in accordance with embodiments of the present invention.

Accordingly, FIG. 4 is a flowchart illustrating an exemplary technique 80 for selecting a multicast IP address in accordance with one embodiment. The technique 80 may be performed by the satellite gateways 14. As described further below, the technique 80 may facilitate the selection of multicast IP addresses by the satellite gateway 14 that are evenly distributed amongst the available number of hash buckets. For example, the technique 80 may select one multicast IP address per hash bucket until each of the hash buckets has one IP address, then select no more than two IP addresses per hash bucket until there are two IP address corresponding to each hash bucket, and so forth.

As illustrated, the technique 80 begins by setting a counter variable MaxBucketCount equal to one, zeroing out an array HashBucketCount, and resetting a remaining multicast address pool. The MaxBucketCount may be indicative of the maximum number of IP addresses that the satellite gateway 14 may permit to hash to the same hash bucket. The HashBucketCount array may contain a location for each HashBucket (e.g., sixty four spaces with a 6-bit hash value). The HashBucketCount array may store the number of currently assigned multicast IP address correspond to each of the hash buckets. For example, if the satellite gateway 14 has assigned IP addresses corresponding to hash buckets one and six, array locations one and six will each contain a number one. The remaining multicast address pool may be a list of IP addresses that are (1) not currently being used to multicast satellite services and (2) have not been temporarily eliminated from the multicast IP address pool, as described below.

Next, the satellite gateway 14 may wait for a service request from one of the STBs 22*a*-22*n*, as indicted in block 84. Once a service request is received, the satellite gateway 14 may determine whether there are any multicast addresses remaining in the multicast address pool, as indicated in block 86. If there are multicast IP addresses remaining in the multicast address pool, the satellite gateway 14 may select one of the remaining IP address, as indicated by block 88, and set a variable n equal to the selected hash bucket number, as indicated in block 90. The satellite gateway 14 may then check the HashBucketCount array to determine whether the value stored in the location n in the HashBucketCount array exceeds the MaxBucketCount, as indicated in block 92. For example, if the MaxBucketCount is one, the satellite gateway 14 will determine whether the HashBucketCount array location corresponding to the selected IP address is less than one (i.e., equal to zero).

If the location within the HashBucketCount array corresponding to the hash bucket associated with the remaining multicast address is not less than the MaxBucketCount, the satellite gateway 14 may remove the selected multicast address from the remaining multicast address pool, as indicated by block 94. After removing the selected multicast IP address from the remaining multicast address pool, the technique 80 may cycle back to block 86, as illustrated in FIG. 4. In this way, satellite gateway 14 may continue checking multicast IP addresses from the remaining multicast address pool until a multicast IP address is discovered that corresponds to a location in the HashBucketCount array with a value less than the max bucket count or until all of the remaining multicast IP addresses are removed from the multicast address pool.

Returning to block 92, if the value of the HashBucketCount array corresponding to the hash value of the selected IP address is less than the MaxBucketCount, the satellite gateway 14 may allocate the selected multicast address and may increment the HashBucketCount array at the location corresponding to the HashBucket for the selected multicast address, as indicated by block 96. After incrementing the HashBucketCount array, the technique 80 may cycle back to block 84 and await another service request from one of the STBs 22*a*-22*n*.

As described above, the satellite gateway 14 may cycle back to block 86 until it allocates one of the multicast IP addresses or until all of the IP addresses have been removed from the remaining multicast address pool. Once all of the multicast addresses have been removed from the multicast address pool, the technique 80 may increment the MaxBucketCount variable (which enables one more IP address to be assigned to each of the hash buckets) and may reset the remaining multicast address pool to include all multicast address not currently in use by the satellite gateway 14, as indicated in block 98. After resetting the remaining multicast address pool, the technique 80 may return to block 86, as described above. In this way, the technique 80 facilitates the even assignment of IP addresses amongst the hash buckets by allocating one IP address per bucket until all of the hash buckets have one IP address or there are no more available IP addresses in the remaining multicast address pool.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method comprising:

selecting a first IP address from a plurality of IP addresses;

hashing the first IP address to create a first hash value corresponding to the first IP address;

determining whether the first hash value corresponds to a second IP address that is in use;

allocating the first IP address if the first hash value does not correspond to the second IP address that is in use; and multicasting a satellite service to a set top box using the first IP address if the first hash value does not correspond to a second IP address that is in use.

2. The method of claim 1, wherein hashing the first IP address comprises hashing the first IP address from a 32-bit value to a 6-bit value.

3. The method of claim 1, wherein determining whether the second IP address is in use comprises determining whether a satellite service is being multicast using the second IP address.

4. The method of claim 1, comprising receiving a request from the set top box for a satellite service.

5. The method of claim 1, wherein multicasting the satellite service comprises multicasting a DirecTV service.

6. The method of claim 1, comprising:

selecting a third IP address if the first hash value does correspond to a second IP address that is in use; and hashing the third IP address to create a second hash value.

7. A head-end unit configured to:

select a first IP address from a plurality of IP addresses;

hash the first IP address to create a first hash value corresponding to the first IP address;

determine whether the first hash value corresponds to a second IP address that is in use;

allocate the first IP address if the first hash value does not correspond to the second IP address that is in use; and multicast a satellite service to a set top box using the first IP address if the first hash value does not correspond to a second IP address that is in use.

8. The head-end unit of claim 7, wherein the satellite gateway is configured to hash the first IP address from a 32-bit value to a 6-bit value.

9. The head-end unit of claim 7, wherein the satellite gateway is configured to determine whether a satellite service is being multicast using the second IP address.

10. The head-end unit of claim 7 wherein the satellite gateway is configured to receive a request from the set top box for a satellite service.

11. The head-end unit of claim 7, wherein the satellite gateway is configured to multicast a DirecTV service.

12. The head-end unit of claim 7, wherein the satellite gateway is configured:

to select a third IP address if the first hash value does correspond to a second IP address that is in use; and to hash the third IP address to create a second hash value.

13. A head-end unit comprising:

means for selecting a first IP address from a plurality of IP addresses;

means for hashing the first IP address to create a first hash value corresponding to the first IP address;

means for determining whether the first hash value corresponds to a second IP address that is in use;

means for allocating the first IP address if the first hash value does not correspond to the second IP address that is in use; and means for multicasting a satellite service to a set top box using the first IP address if the first hash value does not correspond to a second IP address that is in use.

14. The head-end unit of claim 13, wherein hashing the first IP address comprises hashing the first IP address from a 32-bit value to a 6-bit value.

15. The head-end unit of claim 13, wherein means for determining whether the second is in use comprises means for determining whether a satellite service is being multicast using the second IP address.

16. The head-end unit of claim 13, comprising means for receiving a request from the set top box for a satellite service.

17. The head-end unit of claim 13, comprising:

means for selecting a third IP address if the first hash value does correspond to a second IP address that is in use; and means for hashing the third IP address to create a second hash value.

* * * * *